United States Patent
McWhirter

(10) Patent No.: US 12,352,249 B1
(45) Date of Patent: Jul. 8, 2025

(54) HYBRID THERMODYNAMIC CYCLE WITH ISOTHERMAL HEAT ADDITION VIA CONCENTRATED SOLAR POWER ARRAY

(71) Applicant: Jon McWhirter, Kirkland, WA (US)

(72) Inventor: Jon McWhirter, Kirkland, WA (US)

(*) Notice: Subject to any disclaimer, the term of this patent is extended or adjusted under 35 U.S.C. 154(b) by 0 days.

(21) Appl. No.: 18/753,369

(22) Filed: Jun. 25, 2024

Related U.S. Application Data

(60) Provisional application No. 63/524,090, filed on Jun. 29, 2023.

(51) Int. Cl.
*F03G 6/00* (2006.01)
*F03G 6/06* (2006.01)

(52) U.S. Cl.
CPC ........... *F03G 6/0055* (2021.08); *F03G 6/003* (2013.01); *F03G 6/06* (2013.01); *F03G 6/065* (2013.01); *F03G 6/068* (2013.01); *F03G 6/108* (2021.08)

(58) Field of Classification Search
CPC .......... F03G 6/003; F03G 6/0055; F03G 6/06; F03G 6/065; F03G 6/068; F03G 6/108
See application file for complete search history.

(56) References Cited

U.S. PATENT DOCUMENTS

| | | | | |
|---|---|---|---|---|
| 4,313,304 A | * | 2/1982 | Hunt | F02C 1/05 126/643 |
| 2008/0256953 A1 | * | 10/2008 | Arkas | F24S 70/60 126/643 |
| 2011/0239651 A1 | * | 10/2011 | Aoyama | F24S 20/20 126/684 |
| 2015/0338623 A1 | * | 11/2015 | Rosen | F03G 6/068 359/846 |
| 2018/0038353 A1 | * | 2/2018 | Xiao | F03G 6/04 |
| 2020/0263552 A1 | * | 8/2020 | Xiao | F01D 5/28 |

FOREIGN PATENT DOCUMENTS

| | | | | |
|---|---|---|---|---|
| FR | 2844561 A1 | * | 3/2004 | F03G 6/045 |
| GB | 2494140 A | * | 3/2013 | F03G 6/064 |

OTHER PUBLICATIONS

R. M. Abd El-Maksoud, Binary Brayton Cycle with Isothermal Concept, May 28-30, 2013, 15th International Conference on Aerospace Sciences & Aviation Technology (Year: 2013).*

* cited by examiner

*Primary Examiner* — Audrey B. Walter
(74) *Attorney, Agent, or Firm* — Lee & Hayes, P.C.

(57) ABSTRACT

A system includes a compressor, a concentrated solar panel (CSP) array, a turbine, and a recuperator. The turbine has a turbine casing assembly including at least a first casing and a second casing at least partially disposed around the first casing. At least one of the first casing or the second casing is at least partially transparent to solar energy concentrated from the CSP array to isothermally heat a working fluid as the working fluid passes through the turbine.

20 Claims, 7 Drawing Sheets

HYBRID THERMODYNAMIC CYCLE WITH ISOTHERMAL HEAT ADDITION VIA CONCENTRATED SOLAR POWER ARRAY

CROSS-REFERENCE TO RELATED APPLICATIONS

This application claims priority to U.S. Provisional Application No. 63/524,090, filed Jun. 29, 2023, entitled "Hybrid Thermodynamic Cycle with Isothermal Heat Addition via Concentrated Solar Power," the entirety of which is herein incorporated by reference.

BACKGROUND

Thermodynamic cycles, such as the Brayton Cycle, are often used to generate mechanical and/or electrical energy. Such cycles are inherently less efficient than ideal cycles (such as the Carnot, Stirling or Ericsson Cycles). These ideal cycles enjoy high efficiency in some part due to isothermal heat addition. In actual cycles, the isothermal addition of heat may increase the efficiency. However, isothermal heat addition often introduces complexities when extracting energy from the working fluid while simultaneously adding heat.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

DETAILED DESCRIPTION

Figure 1:
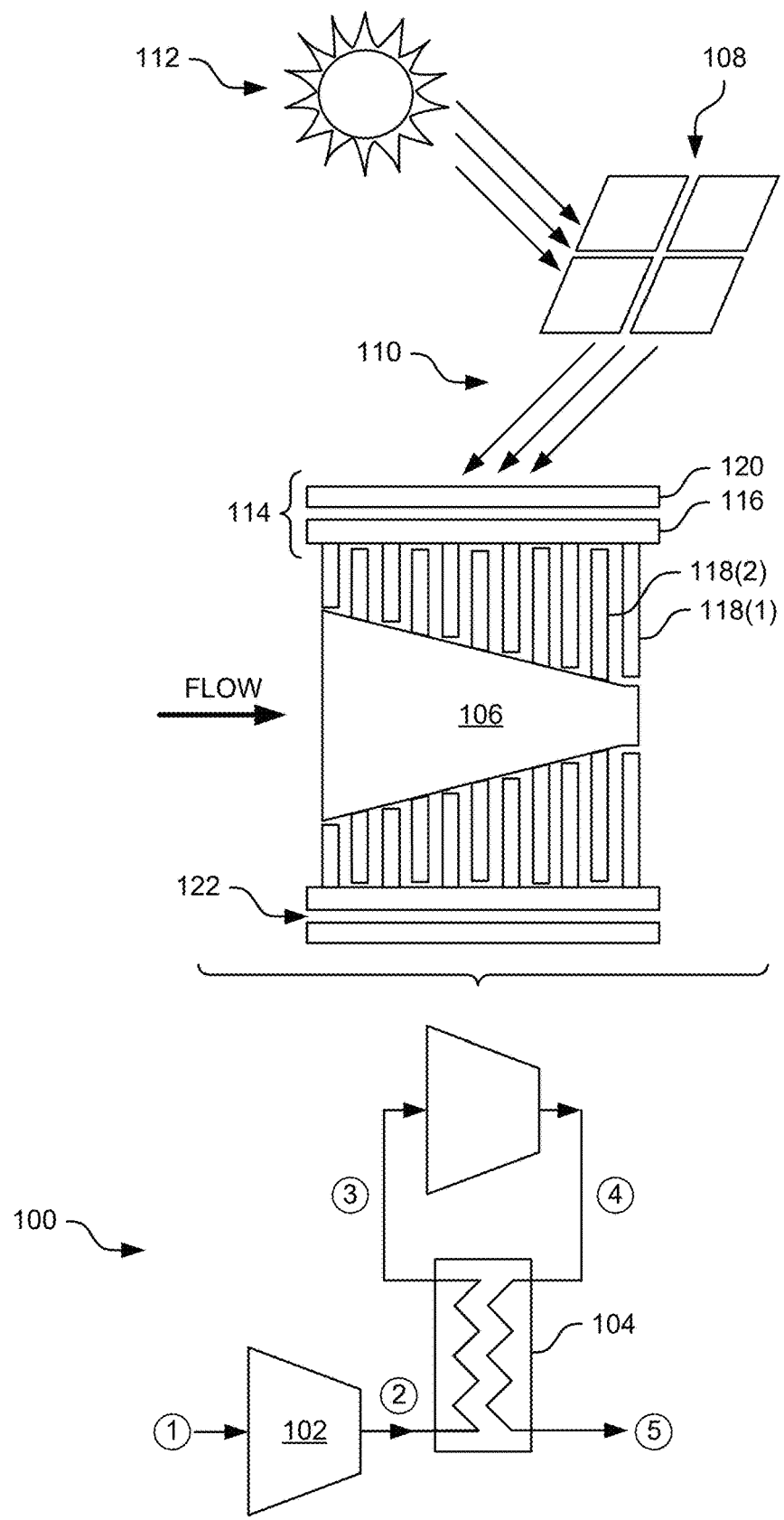
FIG. 1 illustrates an example system employing a hybrid thermodynamic cycle with isothermal heat addition via a concentrated solar power array, according to examples of the present disclosure.

This application is directed, at least in part, to systems, methods, and devices employing a hybrid thermodynamic cycle in which heat is isothermally added to increase efficiencies, according to examples of the present disclosure. In some instances, compared to other thermodynamic cycles, such as the Brayton cycle, the hybrid thermodynamic cycle may have increased efficiencies. In some instances, heat may be added to the hybrid thermodynamic cycle via a concentrated solar panel (CSP) array. For example, the CSP array may focus solar energy through a transparent turbine casing assembly that houses turbine blades to heat the fixed and moving turbine blades. As the working fluid moves through the turbine, the working fluid may be heated convectively from the turbine blades. Additionally, the working fluid may be heated by direct absorption of the solar energy. Accordingly, as the working fluid enters the turbine, the working fluid expands to perform work while simultaneously receiving heat.

Initially, the working fluid within the hybrid thermodynamic cycle may be compressed to a high pressure. For example, a compressor may compress the working fluid. The high-pressure working fluid may then enter, or pass through, a recuperator (alternatively referred to as a regenerator) to be pre-heated (e.g., to recover otherwise wasted thermal energy heat exiting the turbine) before being introduced to the turbine. In some instances, the high-pressure working fluid entering the recuperator is heated by a low-pressure working fluid exiting the turbine. Within the recuperator, the working fluid may also experience an increase in temperature. Upon exiting the recuperator, the working fluid enters the turbine. The turbine and the compressor may be operably coupled to the same shaft. The power produced by the turbine, which is not used to power the compressor (and/or other components carrying out the hybrid thermodynamic cycle), represents the net mechanical power of the hybrid thermodynamic cycle.

Heat is isothermally added to the working fluid within the turbine. For example, via the CSP array, energy may be transferred to the working fluid as the working fluid moves through the turbine. The turbine may be housed within a turbine casing assembly, where the CSP array functions to direct thermal energy to the turbine casing assembly. In some instances, the turbine casing assembly includes a transparent or semi-transparent casing such that thermal energy is capable of being absorbed by the working fluid and/or components of the turbine. The casing supports the fixed blades attached to the inside of the pressure casing. For example, in some instances, some of the thermal energy may be directly absorbed by the working fluid within the turbine. Additionally, the working fluid may receive thermal energy by convection heat transfer from the turbine blades as a result of the turbine blades being heated via the thermal energy, and therein, transferring heat to the working fluid. Regardless of the specific implementation, the CSP array focuses incident solar energy through the transparent or semi-transparent turbine casing assembly before being absorbed by the working fluid. In some instances, the incident radiant energy may be absorbed by external surfaces of the turbine blades. The working fluid, in addition to being heated, performs work as the working fluid moves through the turbine.

An important aspect of carrying out the hybrid thermodynamic cycle is the transparent or semi-transparent turbine casing that allows radiant energy to be transferred to the turbine blades. In some instances, the turbine casing assembly includes one or more layers, casings, shells, etc. For example, the turbine casing assembly may include a pressure casing operating at high temperatures. The pressure casing may be disposed around the turbine blades (e.g., the turbine blades may be disposed within the pressure casing). The turbine casing assembly may include an insulating casing disposed at least partially around the pressure casing. The turbine casing assembly may enclose the turbine (e.g., a rotor and turbine blades).

In some instances, the insulating casing may operate at low temperatures (e.g., ambient temperature). In some instances, the insulating casing may reduce the temperature gradient between an inside and outside of the pressure casing. An amount of spacing disposed between the insulating casing and the pressure casing may be such that the transfer of radiant energy through the turbine casing assembly is maximized. In some instances, the pressure casing and/or the insulating casing may be transparent and/or semi-transparent.

The turbine casing assembly may be manufactured from different materials, such as metals, ceramics, glass, etc. to maximize heat transfer to the turbine blades, the working fluid, etc. Additionally, the materials may be based at least in part on having compatible thermal expansions experienced during the hybrid thermodynamic cycle. In some instances, the pressure casing and the insulating casing may be manufactured from similar or different materials, may include different thicknesses (e.g., wall thickness), etc. In some instances, seals, gaskets, bushings, etc. may be disposed between the insulating casing and the pressure casing to increase heat transfer to the working fluid. Additionally, in some instances, a gap distance disposed between the pressure casing and the insulating casing may be a vacuum. The turbine casing assembly may evenly distribute radiant energy to the working fluid (whether directly or indirectly) to prevent uneven heating (e.g., hot spots). For example, the turbine casing assembly may circumferentially heat around the turbine to avoid cyclic uneven heating.

In some instances, the turbine blades may be fixed and/or moving. The turbine blades may also be hollow (e.g., with an interior cavity) and/or solid. In instances in which the turbine blades are hollow, the turbine blades may be at least partially filed via a fluid (e.g., carbon dioxide). Further, the turbine blades may be coated with materials, finishes, etc. to maximize solar energy absorption. In some instances, the CSP array may be fixed or mobile. The heat transferred to the working fluid, coupled with the extraction of mechanical work from the turbine, may be optimized such that the hybrid thermodynamic cycle produces an isothermal process. It is to be understand that the overall process can be optimized to produce the best overall economics when implementing the hybrid thermodynamic cycle. In some instances, the use of solar energy to heat the working fluid may avoid burning fossil fuels to isothermally add heat to the hybrid thermodynamic cycle.

After expanding in the turbine, the working fluid enters the low-pressure side of the recuperator to heat the incoming high-pressure working fluid. After exiting the recuperator, the working fluid may be either exhausted to the atmosphere (e.g., open loop cycle) or enter a cooler (e.g., closed-loop cycle). In some instances, the hot, expanded, lower-pressure working fluid exiting the turbine may deliver heat to the incoming high-pressure working fluid in the recuperator until the working fluid is exhausted to the atmosphere or enters the cooler (e.g., condenser). In some instances, the cold working fluid may be drawn into a compressor to increase the pressure adiabatically before the cold working fluid enters the recuperator. In some instances, the working fluid may be compressed isentropically (i.e., adiabatically and reversibly) and exits the recuperator at a temperature nearly equal to the temperature of the working fluid exiting the turbine. However, in some instances, the working fluid may be compressed non-isentropically.

In some instances, the recuperator may throttle the supply of the working fluid throughout the hybrid thermodynamic cycle and/or may be variable in size to optimize the efficiency of the hybrid thermodynamic cycle. For example, increasing a surface area of the recuperator (e.g., to increase heat transfer to the high-pressure working fluid) may increase the efficiency of the hybrid thermodynamic cycle. An increase in the surface area, however, may correspondingly increase the size and/or mass of the recuperator. Accordingly, the size of the recuperator and/or the flow of working fluid through the recuperator may be adjusted to optimize the efficiency and economics of the hybrid thermodynamic cycle.

In some instances, the isothermal heat addition employed by the hybrid thermodynamic cycle may be carried out at small, intermediate, and/or large scales as a way to satisfy process power needs. The hybrid thermodynamic cycle may be implemented within a plurality of environments, applications, etc. As non-limiting examples, the hybrid thermodynamic cycle may be used to turn rotors for propulsion or generators for electricity, operate a pump for reverse osmosis purification of water, and so forth. In some instances, the work extracted from the turbine may provide direct mechanical power to a propeller/rotor, or may be coupled to an electrical generator then to an electric motor to drive a propeller or rotor. Additionally, the hybrid thermodynamic cycle may be employed within terrestrial stationary power systems, terrestrial mobile power systems (e.g., airship, drone, etc.), extraterrestrial stationary power systems (e.g., lunar), and/or extraterrestrial, mobile power systems power system (e.g., drones). Suitable working fluids, for closed-loop cycles may include air, nitrogen, helium, carbon dioxide, sulfur hexafluoride, etc. Suitable working fluids for open-loop cycles include air.

Although the hybrid thermodynamic cycle is described herein with certain efficiencies, such as being ideal (e.g., isobaric, isothermal, adiabatic, etc.), it is to be understood that the hybrid thermodynamic cycle may be non-ideal and/or components carrying out the hybrid thermodynamic cycle may be non-ideal. That is, while the hybrid thermodynamic cycle may approach being an ideal process, the hybrid thermodynamic cycle may not achieve ideal. For example, while heat is described as being isothermally added within the turbine, in some instances, the working fluid through the turbine may not be isothermal, but may approach isothermal (e.g., 95% ideal).

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example system 100 employing a hybrid thermodynamic cycle, according to examples of the present disclosure. The system 100, as will be explained herein, may include at least a compressor 102, a recuperator 104, a turbine 106, and a concentrated solar panel (CSP) array 108. In some instances, the CSP array 108 may be separate from the system 100, or a component of the system 100.

At "1" in FIG. 1, a working fluid may enter the compressor 102. At "2" in FIG. 1, the working fluid may exit the compressor 102. In some instances, compression of the working fluid between "1" and "2" may be isentropic. During compression, the working fluid may reduce in volume and increase in pressure. Additionally, during compression, the working fluid may increase in temperature.

Between "2" and "3" in FIG. 1, the working fluid may pass through the recuperator 104 to be heated from the working fluid exiting the turbine 106. Within the recuperator 104, the pressure of the working fluid may remain constant (e.g., isobaric). In some instances, within the recuperator 104, the pressure may be non-isobaric. However, within the recuperator 104, the entropy and/or the volume of the working fluid may increase.

Between "3" and "4" in FIG. 1, heat may be isothermally added in the turbine 106 via solar energy 110 produced from the sun 112 and which is concentrated from the CSP array 108. The heat may be isothermally added while work is being done (or extracted) by the working fluid as the working fluid passes through the turbine 106. Between "3" and "4", the temperature of the working fluid may remain constant. Additionally, between "3" and "4", the pressure of the working fluid may be reduced and the volume of the working fluid may increase.

The turbine 106 may include, be a component of, or may be disposed within a turbine casing assembly 114. The turbine casing assembly 114, in some instances, may include one or more layers, shells, etc. For example, a first casing 116 of the turbine casing assembly 114 may represent a pressure casing. The first casing 116, as shown, may be disposed around turbine blades 118 of the turbine 106. A second casing 120 of the turbine casing assembly 114 may represent an insulating casing. The first casing 116 may operate at higher temperatures than the first casing 116. The second casing 120, as shown, may be disposed around the first casing 116. In some instances, the second casing 120 may reduce a temperature gradient between an inside and outside of the first casing 116.

In some instances, a gap distance 122 (e.g., layer, void, etc.) may be disposed between the first casing 116 and the second casing 120. In some instances, a size, thickness, etc. of the gap distance 122 may maximize the transfer of radiant energy through the turbine casing assembly 114. In some instances, the gap distance 122 may be a vacuum (e.g., a vacuum may exist between the first casing 116 and the second casing 120). Additionally, or alternatively, in some instances, seals, gaskets, bushings, etc. may be disposed between the first casing 116 and the second casing 120 to increase heat transfer to the turbine blades 118 and/or the working fluid and to minimize thermal energy losses from the turbine and/or casing.

In some instances, the first casing 116 and/or the second casing 120 may be transparent or semi-transparent. This enables the solar energy 110 to be absorbed by the working fluid and/or components of the turbine 106. For example, in some instances, some of the solar energy 110 may be directly absorbed by the working fluid within the turbine 106. Additionally, the working fluid may receive thermal energy by convection heat transfer from the turbine blades 118, as a result of the turbine blades 118 being heated via the solar energy 110. Therein, as the turbine blades 118 are heated, the turbine blades 118 may transfer heat to the working fluid. However, regardless of whether the working fluid is heated directly via the solar energy 110, or indirectly, via the turbine blades 118, the CSP array 108 serves to focus the solar energy 110 through the turbine casing assembly 114 before being absorbed by the working fluid (directly) and/or the turbine blades 118 (indirectly). As such, the working fluid, in addition to being heated, performs work as the working fluid moves through the turbine 106.

The turbine casing assembly 114 may be manufactured from different materials, such as metals, ceramics, glass, etc. to maximize heat transfer to the turbine blades 118, the working fluid, etc. Additionally, the materials may be based at least in part on thermal expansions experienced by the turbine 106, turbine blades 118, or other components carrying out the hybrid thermodynamic cycle. In some instances, the first casing 116 and the second casing 120 may be manufactured from similar to different materials, may include different thicknesses (e.g., wall thickness), etc. The turbine casing assembly 114 may evenly distribute radiant energy to the turbine blades 118 to prevent uneven heating (e.g., hot spots).

In some instances, the turbine blades 118 may be fixed and/or moving. For example, the turbine blades 118 may include first turbine blades 118(1) that are fixed (e.g., to the first casing 116) and/or second turbine blades 118(2) that are moving (e.g., coupled to a rotor of the turbine 106). The turbine blades 118 may also be hollow (e.g., with an interior cavity) and/or solid. In instances in which the turbine blades 118 are hollow, the turbine blades 118 may be at least partially filed via a fluid (e.g., carbon dioxide). Further, the turbine blades 118 may be coated with materials, finishes, etc. to maximize absorption of the solar energy 110.

Between "4" and "5", the working fluid may pass through the recuperator 104. During this process, the pressure of the working fluid may remain constant, but the volume of the working fluid may be reduced. The temperature of the working fluid may also be reduced. For example, as the working fluid exiting the turbine 106 and/or passing through the recuperator 104 (e.g., as a low-pressure working fluid) heats the working fluid exiting the compressor 102 and/or passing through the recuperator 104 (e.g., as a high-pressure working fluid), the temperature of the working fluid may be reduced. After exiting the recuperator 104, for example, at "5" in FIG. 1, the working fluid may be exhausted into the atmosphere (e.g., open loop cycle) or may pass through a cooler (e.g., closed-loop cycle) before being reintroduced to the compressor 102.

In some instances, the recuperator 104 may throttle the supply of the working fluid throughout the hybrid thermodynamic cycle and/or may be variable in size to optimize the efficiency of the hybrid thermodynamic cycle. For example, a surface area of the recuperator 104 may be increased to effectuate an increase in heat transfer to the high-pressure working fluid exiting the recuperator.

Although not shown, the turbine 106 may be operably coupled (e.g., via shafts, rotors, etc.) to a generator for generating power. In some cases, the turbine will be connected to the compressor. Also, in some instances, the CSP array 108 may be fixed or mobile. The CSP array 108 may be of any size and may include any number of mirrors or reflective surfaces, etc. In some instances, a size of the CSP array 108 may be based at least in part on an amount of work to be performed by the turbine 106. Accordingly, the hybrid thermodynamic cycle may be carried out at small, intermediate, and/or large scales.

Figure 2:
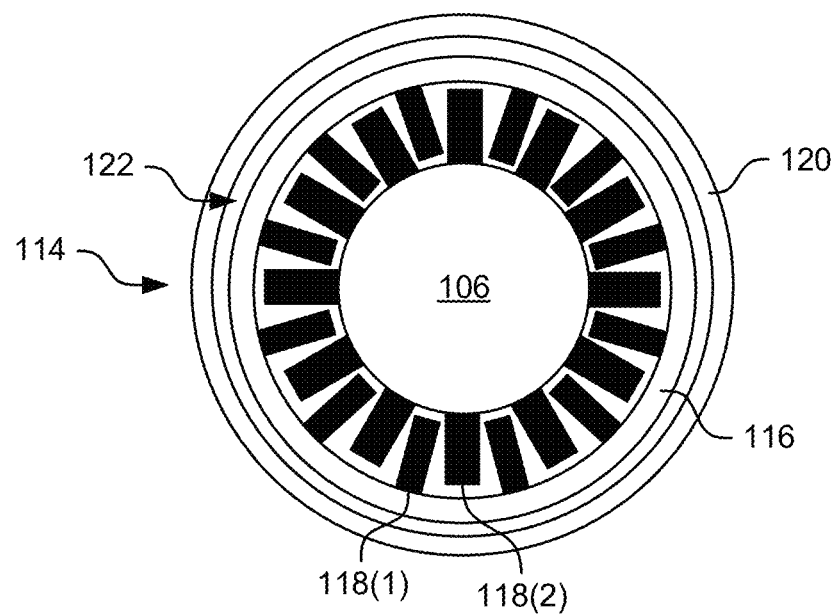
FIG. 2 illustrates an example turbine casing assembly of the system of FIG. 1, according to examples of the present disclosure.

FIG. 2 illustrates an end view of the turbine 106, according to examples of the present disclosure. As introduced above, the turbine 106 may include a turbine casing assembly 114 having the first casing 116 and the second casing 120. The gap distance 122 may represent an insulating layer between the first casing 116 and the second casing 120. The first turbine blades 118(1) may be affixed to the first casing 116 and remain stationary, while the second turbine blades 118(2) may be affixed to a rotor of the turbine 106 and may move during expansion of the working fluid. The solar energy 110 may be absorbed by the first turbine blades 118(1) and/or the second turbine blades 118(2), which may therein transfer heat to the working fluid to add heat to the hybrid thermodynamic cycle, resulting in isothermal heat transfer to the working fluid.

Although a particular shape of the first casing 116 and/or the second casing 120 is shown, other shapes are envisioned. For example, the first casing 116 and/or the second casing 120 may be circular. Alternatively, the first casing 116 and/or the second casing may be dodecagon-shaped (e.g., having flat regions).

Figure 3A:
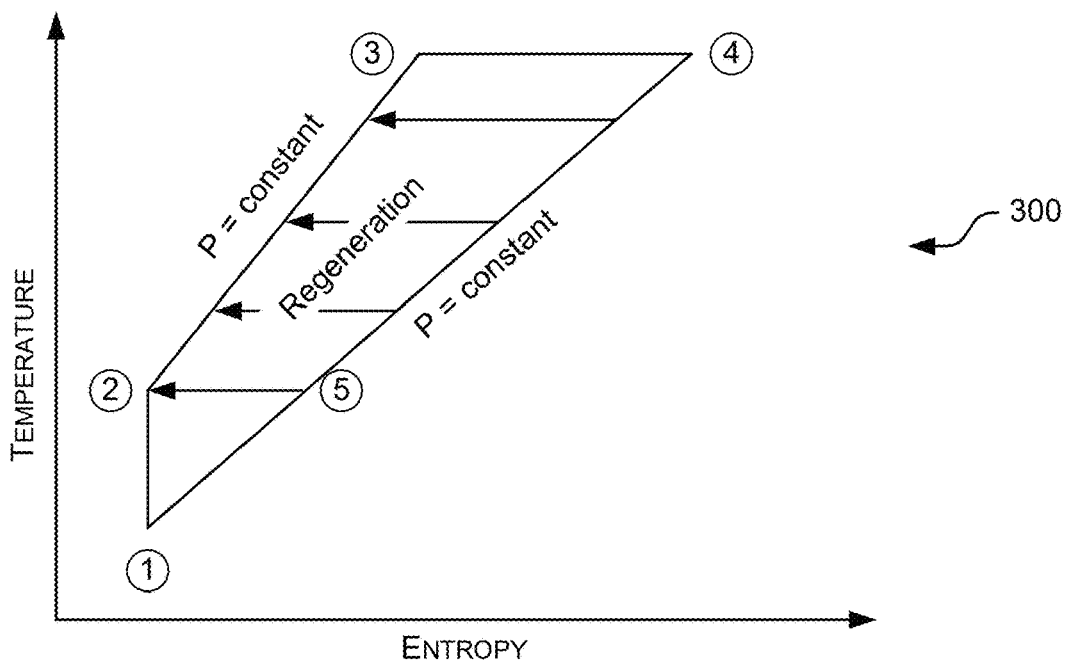
FIG. 3A illustrates a temperature-entropy diagram of the hybrid thermodynamic cycle of FIG. 1, according to examples of the present disclosure.
Figure 3B:
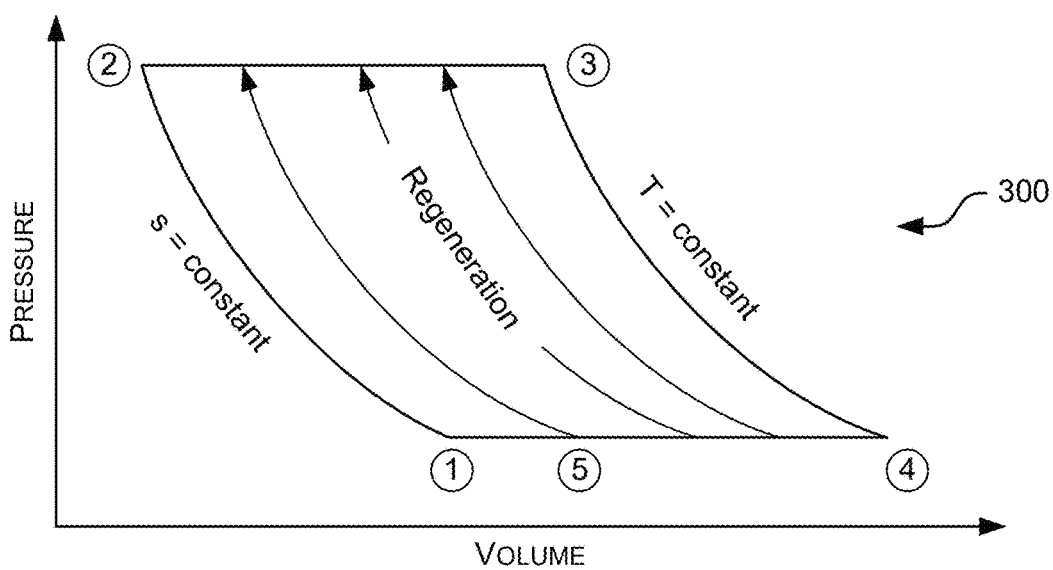
FIG. 3B illustrates a pressure-volume diagram of the hybrid thermodynamic cycle of FIG. 1, according to examples of the present disclosure.

FIGS. 3A and 3B illustrate an example open-loop system employing a hybrid thermodynamic cycle 300 on a temperature-entropy diagram and a pressure-volume diagram, respectively, according to examples of the present disclosure.

At "1" in FIGS. 3A and 3B, the working fluid may enter the compressor 102 and at "2" in FIGS. 3A and 3B, the working fluid may exit the compressor 102. As shown, the temperature of the working fluid, between "1" and "2" in FIGS. 3A and 3B may increase and the pressure may increase. Additionally, the working fluid may be reduced in volume. However, between "1" and "2" in FIGS. 3A and 3B, the entropy may be constant (e.g., isentropic).

At "2" in FIGS. 3A and 3B, the working fluid may enter the recuperator 104, and at "3" in FIGS. 3A and 3B, the working fluid may exit the recuperator 104. Between "2" and "3" in FIGS. 3A and 3B, the working fluid may be heated from the working fluid exiting the turbine 106 (as discussed herein). As shown in the temperature-entropy diagram, regeneration occurs between "2" and "3". Within the recuperator 104, the pressure of the working fluid may be constant (e.g., isobaric), but the entropy, temperature, and/or volume of the working fluid may increase. The working fluid exiting the recuperator 104 may be a high-pressure working fluid. In some instances, a size of the recuperator 104 may be used to throttle the working fluid throughout the hybrid thermodynamic cycle 300. The recuperator 104 may be a concurrent flow, counter flow, or other suitable recuperator.

At "3" in FIGS. 3A and 3B, the working fluid may enter the turbine 106 and at "4" in FIGS. 3A and 3B, the working fluid may exit the turbine 106. Between "3" and "4" in FIGS. 3A and 3B, heat may be isothermally added to the hybrid thermodynamic cycle 300. For example, the solar energy 110 may be concentrated (e.g., via the CSP array 108) onto the turbine 106. As discussed above, the solar energy 110 may be absorbed directly by the working fluid, or may be heated indirectly via the turbine blades 118. Thus, as work is being performed by the working fluid (e.g., during expansion in the turbine 106), the working fluid is simultaneously being heated via the solar energy 110. During this process, and as shown from "3" to "4" in FIGS. 3A and 3B, the temperature of the working fluid remains constant. Additionally, the pressure of the working fluid may be reduced, the volume of the working fluid may increase, and/or the entropy may increase.

At "4" in FIGS. 3A and 3B, the working fluid may enter the recuperator 104 (e.g., as a low-pressure working fluid), and at "5" in FIGS. 3A and 3B, the working fluid may exit the recuperator 104. During this process, the pressure of the working fluid may remain constant, however, the volume of the working fluid may be reduced. The temperature of the working fluid may also be reduced from "4" and "5" in FIGS. 3A and 3B.

At "5" in FIGS. 3A and 3B, the working fluid may enter a cooler (e.g., condenser or heat exchanger), for example, and at "1" in FIGS. 3A and 3B, the working fluid may exit the cooler and enter the compressor 102. The cooler may serve to cool the working fluid entering the compressor 102 (e.g., in a closed-loop system). Between "1" and "5" in FIGS. 3A and 3B, the temperature and the entropy of the working fluid may be reduced. The volume of the working fluid may also be reduced. The process may also be isobaric. In instances in which the hybrid thermodynamic cycle 300 is open-loop, the working fluid may be exhausted to an environment (e.g., atmosphere) after "5".

The hybrid thermodynamic cycle 300 is shown as being ideal. However, in some instances, the hybrid thermodynamic cycle 300 may be non-ideal. For example, between "2" and "3" the hybrid thermodynamic cycle 300 is shown as being isobaric, between "3" and "4" the hybrid thermodynamic cycle 300 is shown as being isothermal, and between "4" and "5" the hybrid thermodynamic cycle 300 is shown as being isobaric. However, in some instances, the hybrid thermodynamic cycle 300 may be non-ideal during these states or points. While the hybrid thermodynamic cycle 300 may approach ideal, the hybrid thermodynamic cycle 300 may not actually achieve an ideal thermodynamic process.

Figure 4A:
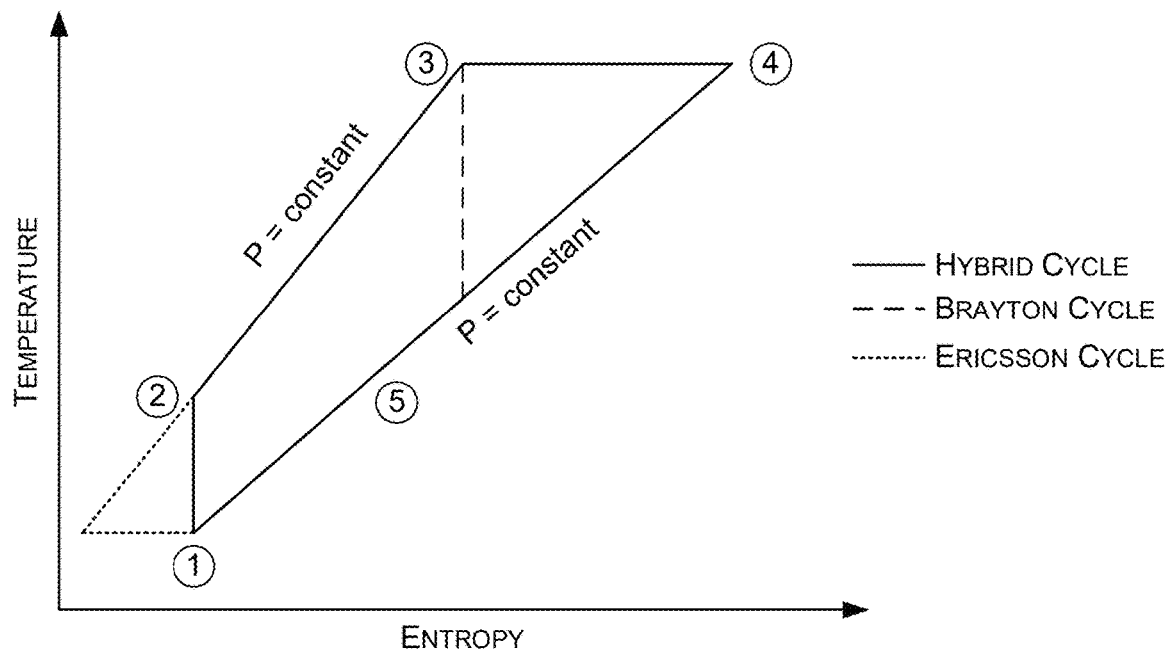
FIG. 4A illustrates a comparison of the hybrid thermodynamic cycle of FIG. 1 with an ideal Brayton cycle and an ideal Ericsson cycle on a temperature-entropy diagram, according to examples of the present disclosure.
Figure 4B:
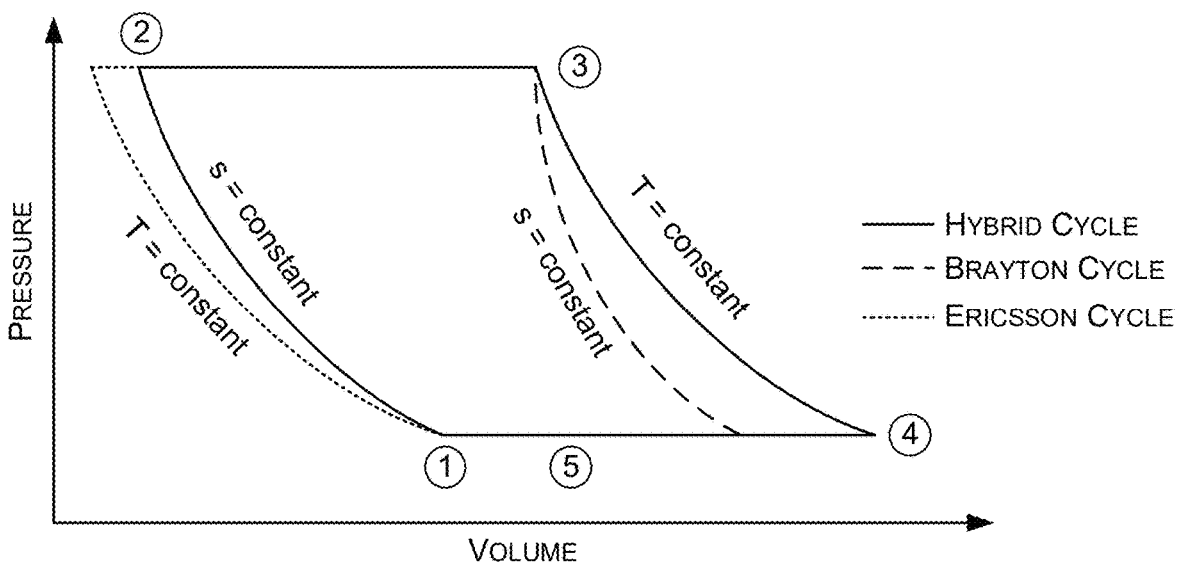
FIG. 4B illustrates a comparison of the hybrid thermodynamic cycle of FIG. 1 with an ideal Brayton cycle and an ideal Ericsson cycle on a pressure-volume diagram, according to examples of the present disclosure.

FIGS. 4A and 4B illustrate a comparison of the ideal hybrid thermodynamic cycle 300 with an ideal Brayton cycle and an ideal Ericsson cycle, according to examples of the present disclosure. FIG. 4A is a comparison of the ideal hybrid thermodynamic cycle 300 with the ideal Brayton cycle and the ideal Ericsson cycle on a temperature-entropy diagram, while FIG. 4B is a comparison of the hybrid thermodynamic cycle 300 with the ideal Brayton cycle and the ideal Ericsson cycle on a pressure-volume diagram. In FIGS. 4A and 4B, "1"-"5" may be similar to those discussed hereinabove with regard to FIGS. 3A and 3B.

In comparison to the ideal Brayton cycle, heat is not isothermally added. For example, in FIG. 4A, the ideal Brayton cycle may have heat input over a range of temperatures and experiences a reduction in temperature through the turbine 106. As a result, as shown in FIG. 4B, the average temperature of heat addition of the ideal Brayton cycle may be less than that of the hybrid thermodynamic cycle 300.

Figure 5:
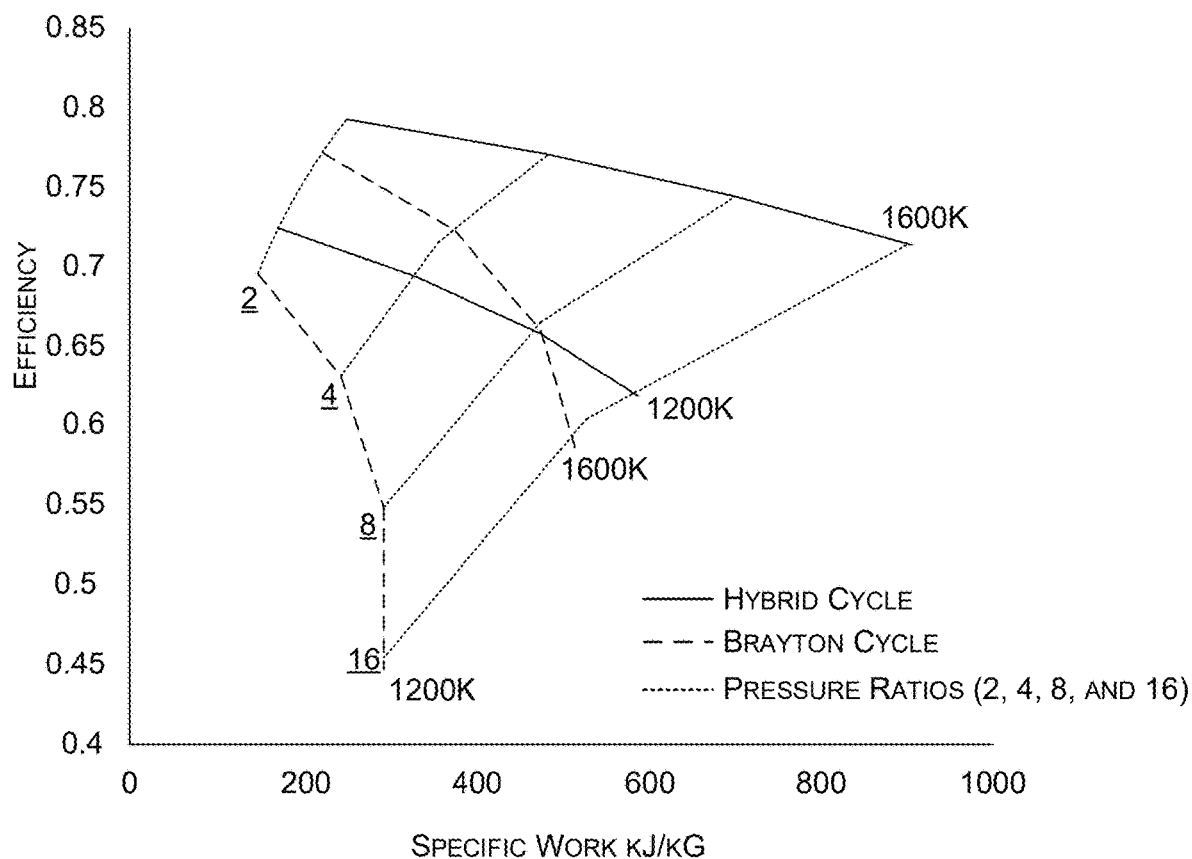
FIG. 5 illustrates a comparison of efficiencies of the ideal hybrid thermodynamic cycle of FIG. 1 with an ideal Brayton cycle, according to examples of the present disclosure.

FIG. 5 illustrates a comparison of efficiencies of an ideal Brayton cycle with regeneration, and the ideal hybrid thermodynamic cycle 300, according to examples of the present disclosure. The working fluid in the diagram shown in FIG. 5 may be air. FIG. 5 illustrates a comparison of the efficiencies of the ideal Brayton cycle and the hybrid thermodynamic cycle 300 at different pressure ratios (e.g., across the turbine 106). As shown, the efficiency of the ideal hybrid thermodynamic cycle 300 may be greater than the ideal Brayton cycle, given the isothermal heat addition, at pressure ratios of 2, 4, 8, and 16, at 1200K and 1600K.

Figure 6A:
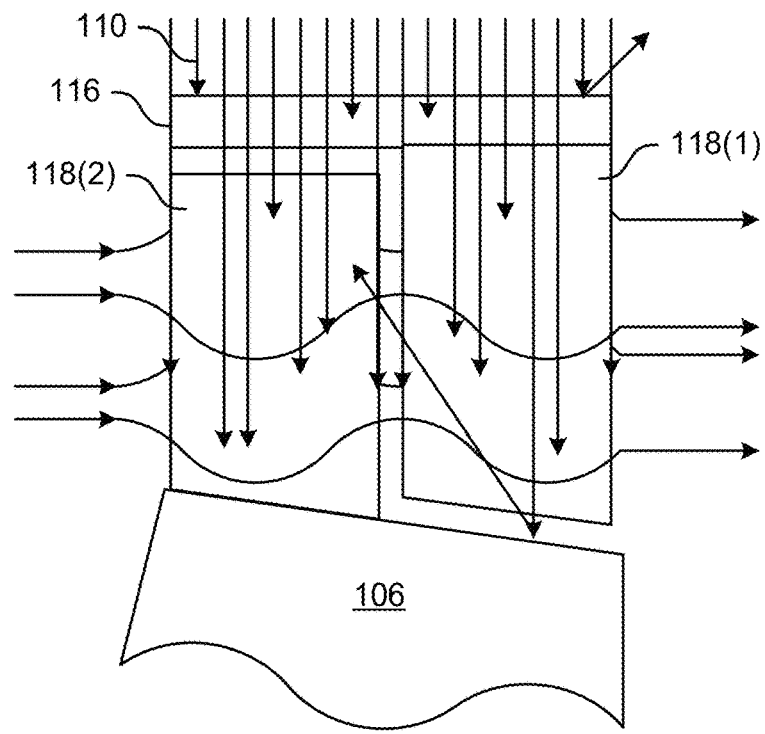
FIG. 6A illustrates a first example of isothermally heating a working fluid with the system of FIG. 1, according to examples of the present disclosure.
Figure 6B:
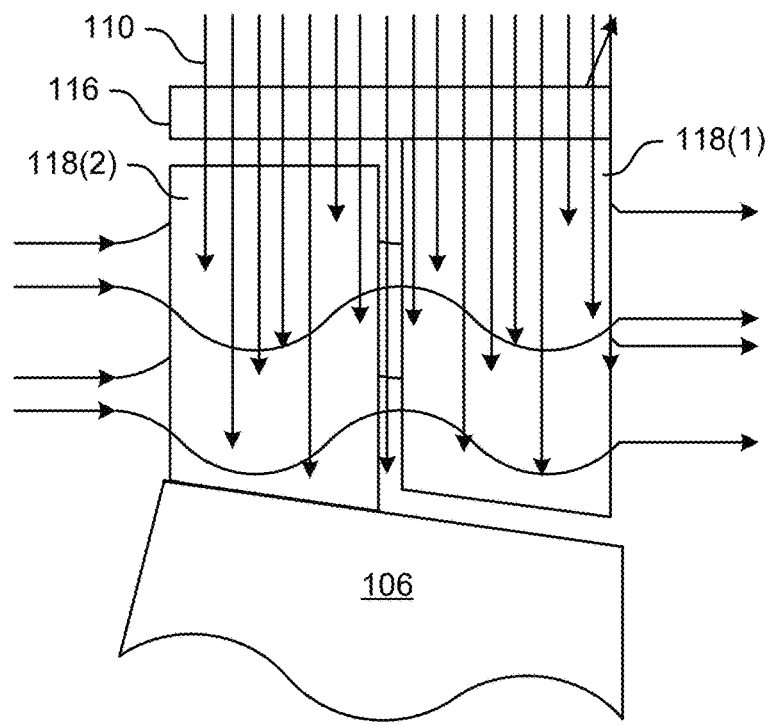
FIG. 6B illustrates a second example of isothermally heating a working fluid with the system of FIG. 1, according to examples of the present disclosure.

FIGS. 6A and 6B illustrate different examples of isothermal heat addition within the turbine 106, according to examples of the present disclosure. FIG. 6A the turbine blades 118 may be solid, whereas in FIG. 6B, the turbine blades 118 may be hollow (e.g., containing a cavity).

In FIG. 6A, the solar energy 110 may at least partially pass through the first casing 116 of the turbine casing assembly 114 for heating a working fluid passing through the turbine 106. The solar energy 110 may heat the working fluid and/or the turbine blades 118, which may in turn convectively heat the working fluid. In FIG. 6B, the solar energy 110 may at least partially pass through the first casing 116 for heating the working fluid and/or the turbine blades 118. However, compared to FIG. 6A, in some instances, the turbine blades 118 in FIG. 6B, which are hollow, may enhance the absorption of the solar energy 110. With the increased absorption of the solar energy 110, the working fluid may be heated by a greater amount than compared to when the turbine blades 118 are solid.

In both FIGS. 6A and 6B, the solar energy 110 or thermal energy associated with the solar energy 110, may enter a space between the turbine blade 118 tips for absorption by the turbine blades 118 for heating the working fluid. In some instances, the turbine blades, or a portion thereof, may be heated by being affixed to the first casing 116 (e.g., heat may transfer from the first casing 116 to the turbine blades 118).

Figure 7:
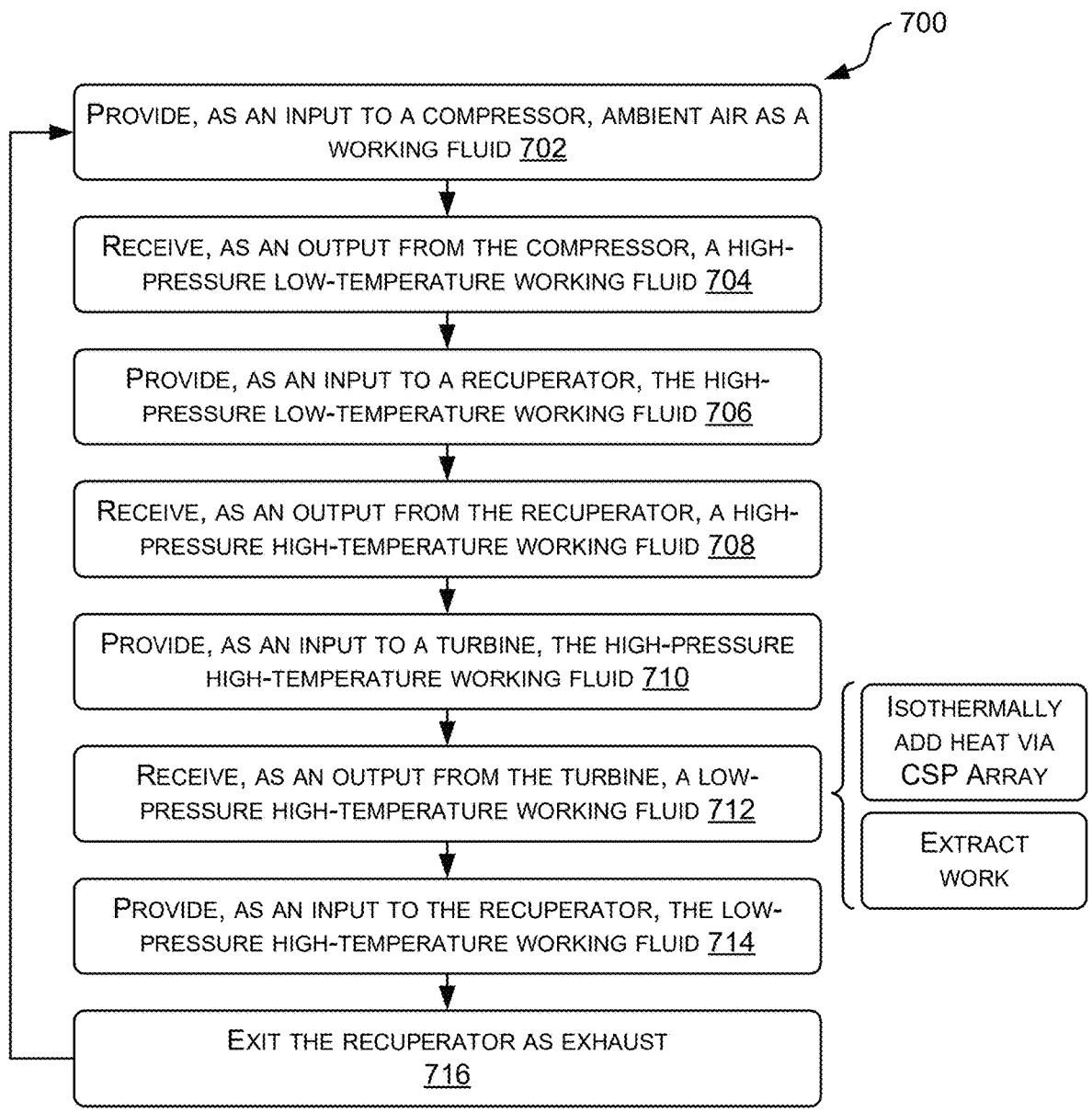
FIG. 7 illustrates an example process for isothermally heating the working fluid using the system of FIG. 1, according to examples of the present disclosure.

FIG. 7 illustrates an example process 700 for carrying out the hybrid thermodynamic cycle 300 as described herein, according to examples of the present disclosure. At 702, the process 700 may include providing, as input to a compressor, a ambient air as working fluid. For example, the working fluid may be provided as input to the compressor 102. In an open loop system, air may be the working fluid. However, in a close loop system, any suitable working fluid may be used (e.g., carbon dioxide, ammonia, etc.).

At 704, the process 700 may include receiving, as an output from the compressor, a high-pressure low-temperature working fluid. For example, the compressor 102 may compress the working fluid during which the working fluid may reduce in volume. In some instances, compression of the working fluid may be isentropic.

At 706, the process 700 may include providing, as an input to a recuperator, the high-pressure low-temperature working fluid. For example, the working fluid may enter the recuperator, whereby the working fluid may be heated via a low-pressure high-temperature working fluid (as discussed herein) exiting the turbine 106.

At 708, the process 700 may include receiving, as an output from the recuperator, a high-pressure high-temperature working fluid. Through the recuperator 104, the pressure of the working fluid may be constant (e.g., isobaric), but the entropy, temperature, and/or volume of the working fluid may increase. In some instances, the recuperator may be used to throttle a supply of the working fluid throughout the hybrid thermodynamic cycle 300.

At 710, the process 700 may include providing, as an input to a turbine, the high-pressure high-temperature working fluid. For example, the working fluid may be provided to the turbine 106.

At 712, the process 700 may include receiving, as an output from the turbine, a low-pressure high-temperature working fluid. For example, the working fluid may be expanded in the turbine 106, thereby reducing in pressure, but may be isothermally heated via the CSP array 108. For example, heat may be added to the hybrid thermodynamic cycle 300, and more particularly, to the working fluid as the working fluid passes through the turbine. Simultaneously, work may be extracted from the working fluid (e.g., to power the compressor, generate electricity via a generator, etc.). During the isothermal heat addition, the temperature of the working fluid remains constant. Additionally, the pressure of the working fluid may be reduced, the volume of the working fluid may increase, and/or the entropy may increase.

At 714, the process 700 may include providing, as an input to the recuperator, the low-pressure high-temperature working fluid. For example, the low-pressure high-temperature working fluid may heat the high-pressure low-temperature working fluid entering the recuperator 104 (e.g., at 706).

At 716, the process 700 may include exiting the recuperator as exhaust. For example, in an open loop system, the working fluid may be exhausted into the atmosphere. In a closed loop system, following 714, the process 700 may include receiving, as an output from the recuperator, the low-pressure low-temperature working fluid. That is, as the low-pressure high-temperature working fluid heats the working fluid passing through the recuperator 104 (e.g., from 706 to 708), the working fluid may reduce in temperature. From 716, in some instances for a closed loop system, the process 700 may loop to 702, pass through a cooler (e.g., a heat exchanger or condenser)

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
compressing, in a compressor, a working fluid;
heating, in a recuperator, the working fluid;
expanding, in a turbine, the working fluid to generate work, wherein a first casing and a second casing are disposed around the turbine, the first casing and the second casing being at least partially transparent to solar energy concentrated from a solar panel array;
isothermally heating, at least partially simultaneously with expanding the working fluid to generate work, the working fluid via the solar energy concentrated from the solar panel array; and
one of:
cooling, in a condenser or a heat exchanger, the working fluid, or
exhausting the working fluid.

2. The method of claim 1, wherein a gap distance is disposed between the first casing and the second casing.

3. The method of claim 1, wherein the first casing operates at a temperature greater than a temperature of the second casing.

4. The method of claim 1, wherein at least a portion of turbine blades of the turbine are hollow.

5. The method of claim 1, wherein isothermally heating the working fluid comprises:
directly heating the working fluid via the solar energy; and indirectly heating the working fluid via turbine blades of the turbine, wherein the solar energy is absorbed by the turbine blades to indirectly heat the working fluid.

6. A system comprising:
a compressor;
a concentrated solar panel (CSP) array;
a turbine having a turbine casing assembly including at least a first casing and a second casing at least partially disposed around the first casing, wherein the first casing is at least partially transparent to solar energy concentrated from the CSP array such that the solar energy is configured to isothermally heat a working fluid as the working fluid passes through the turbine; and
a recuperator configured to heat the working fluid exiting the compressor with the working fluid exiting the turbine.

7. The system of claim 6, further comprising a cooler configured to cool the working fluid exiting the recuperator, before the working fluid is reintroduced to the compressor.

8. The system of claim 6, wherein the working fluid is configured to expand in the turbine to generate work while simultaneously being isothermally heated.

9. The system of claim 6, wherein:
the solar energy is configured to directly heat the working fluid;
turbine blades of the turbine are configured to indirectly heat the working fluid; and
the turbine blades are configured absorb the solar energy to indirectly heat the working fluid.

10. The system of claim 9, wherein at least a portion of the turbine blades are hollow.

11. The system of claim 6, wherein the first casing is configured to operate at a temperature greater than a temperature of the second casing.

12. The system of claim 6, wherein a vacuum exists between the first casing and the second casing.

13. The system of claim 6, wherein following the recuperator heating the working fluid exiting the compressor with the working fluid exiting the turbine, the working fluid is configured to exhaust to an atmosphere.

14. A system comprising:
a compressor;
a turbine including a first casing and a second casing disposed within the first casing, the second casing being at least partially transparent to solar energy, wherein the solar energy is configured to isothermally heat a working fluid passing through the turbine while the working fluid is expanded in the turbine to generate work; and
a recuperator configured to heat the working fluid exiting the compressor with the working fluid exiting the turbine.

15. The system of claim 14, wherein a concentrated solar panel array is configured to concentrate the solar energy.

16. The system of claim 14, wherein the first casing is at least partially transparent to the solar energy.

17. The system of claim 14, wherein:
the solar energy is configured to directly heat the working fluid;
turbine blades of the turbine are configured to indirectly heat the working fluid; and
the turbine blades are configured absorb the solar energy to indirectly heat the working fluid.

18. The system of claim 14, further comprising a cooler configured to cool the working fluid exiting the recuperator, before being reintroduced to the compressor.

19. The system of claim 14, wherein the working fluid is configured to be exhausted to an atmosphere after heating the working fluid exiting the compressor.

20. The system of claim 14, wherein a vacuum exists between the first casing and the second casing.

* * * * *